US009264955B1

(12) United States Patent
Wingo et al.

(10) Patent No.: US 9,264,955 B1
(45) Date of Patent: Feb. 16, 2016

(54) METHOD AND APPARATUS FOR FREQUENCY MANAGEMENT

(75) Inventors: Louie E. Wingo, Liberty, MO (US);
Craig Sparks, Overland Park, KS (US);
Trevor D. Shipley, Olathe, KS (US);
Cesar Perez, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 343 days.

(21) Appl. No.: 13/422,074

(22) Filed: Mar. 16, 2012

(51) Int. Cl.
*H04W 36/04* (2009.01)
*H04W 36/14* (2009.01)
*H04W 36/08* (2009.01)
*H04W 36/30* (2009.01)
*H04W 36/18* (2009.01)
*H04W 36/12* (2009.01)
*H04W 48/18* (2009.01)

(52) U.S. Cl.
CPC ............. *H04W 36/04* (2013.01); *H04W 36/08* (2013.01); *H04W 36/12* (2013.01); *H04W 36/14* (2013.01); *H04W 36/18* (2013.01); *H04W 36/30* (2013.01); *H04W 48/18* (2013.01)

(58) Field of Classification Search
CPC ... H04W 72/10; H04W 36/005; H04W 36/14; H04W 36/28; H04W 36/08; H04W 36/26; H04W 36/0022; H04W 36/0055; H04W 36/0088; H04W 36/12; H04W 36/00
USPC ........ 455/404.2, 435.1, 456.1, 458, 509, 557; 370/312, 329, 336, 342, 345
See application file for complete search history.

(56) References Cited

U.S. PATENT DOCUMENTS

| 5,774,809 | A | 6/1998 | Tuutijarvi et al. |
| 7,567,807 | B2 * | 7/2009 | Dunn ..................... H01Q 1/241 455/436 |
| 8,483,184 | B2 * | 7/2013 | Yokoyama ............ H04W 36/30 370/332 |
| 8,706,113 | B2 * | 4/2014 | Ghai et al. ................. 455/435.2 |
| 8,780,867 | B2 * | 7/2014 | Chin ..................... H04W 36/14 370/331 |
| 2005/0226400 | A1 * | 10/2005 | Farber ............... H04M 15/8044 379/114.01 |
| 2006/0142032 | A1 * | 6/2006 | Derakhshan et al. ......... 455/509 |
| 2006/0291455 | A1 * | 12/2006 | Katz et al. ..................... 370/355 |
| 2011/0051695 | A1 * | 3/2011 | Dinan ........................... 370/336 |
| 2012/0033651 | A1 * | 2/2012 | Dinan ........................... 370/336 |

OTHER PUBLICATIONS

U.S. Appl. No. 13/196,353, filed Aug. 2, 2011.

* cited by examiner

Primary Examiner — Liton Miah

(57) ABSTRACT

Disclosed are a method, apparatus, and system for managing frequency use in a system while engaged in multiple communications. When a wireless communication device (WCD) is engaging in a first communication on a first frequency, the WCD receives a request for the WCD to engage in a second communication. Responsive to receiving the request, the WCD hands off the first communication from the first frequency to a second frequency and engages in the second communication on the first frequency. The method may thereby help to reduce likelihood of interference.

15 Claims, 4 Drawing Sheets

METHOD AND APPARATUS FOR FREQUENCY MANAGEMENT

BACKGROUND

In a typical wireless communication system, a radio access network (RAN) includes one or more base stations, access points, or the like, that radiate to define one or more wireless coverage areas, such as cells and cell sectors, in which suitably equipped wireless communication devices (WCDs) can operate. In practice, a RAN and its served WCDs will be arranged to communicate with each other according to an agreed air interface protocol that defines a mechanism for use of communication resources to support wireless exchange of voice, data, multimedia, and/or other content. Examples of such protocols include CDMA (e.g., 1xRTT or 1xEV-DO), WiMAX, LTE, IDEN, GSM, WIFI, HSPA, among others now known or later developed. Further, some WCDs may be configured with one or more radios to support communications under one or more air interface protocols.

In general, the wireless frequency spectrum that is available to carry these air interface communications may be divided into a number of frequency bands, and particular communications may occur on specified frequency channels within these bands. By way of example, the frequency spectrum may be divided into profile frequency bands such as an 800 MHz (cellular) band, a 1.9 GHz (PCS) band, and a 2.5 GHz (BRS/EBS) band, and each band may then be divided into frequency channels, such as particular 1.25 MHz blocks or 5 MHz blocks, around the profile frequency. For instance, in a system operating in the 800 MHz band, air interface communications may occur on frequency channels defined near 800 MHz. Likewise, in a system operating in the 1.9 GHz band, air interface communications may occur on frequency channels defined near 1.9 GHz. Similarly, in a system operating in the 2.5 GHz band, air interface communications may occur on frequency channels defined near 2.5 GHz.

OVERVIEW

In various examples disclosed herein, a RAN and a served WCD are arranged to engage in multiple communications with each other under one or more air interface protocols. The RAN and the served WCD can engage in the multiple communications simultaneously or substantially simultaneously. In general, such communications may include one or more types of content, for example, voice, data, multimedia, and/or other types of content. In such an implementation, or in other implementations, when a WCD is engaging in a particular communication under a particular air interface, the WCD may experience interference from another communication under the same or another air interface protocol. In a worst case, this interference may result in blocked or dropped communications, degraded communications, or other user-experience issues.

Generally in the present disclosure, multiple communications under one or more air interface protocols can be segregated from each other in the frequency domain. For example, particular frequency bands, channels, and/or frequencies can be preferably utilized for particular communications and/or particular air interface protocols. This segregation of communications would ideally be sufficient to avoid having communications interfere with one another.

Disclosed herein are a method and corresponding apparatus and system to help manage use of frequency resources and help avoid interference when a WCD engages in multiple communications.

According to the method, while the WCD is engaging in a first communication on a first frequency, the WCD receives a request to engage in a second communication. In response, the WCD hands off the first communication from the first frequency to a second frequency and engages in the second communication on the first frequency. By handing off the first communication to the second frequency and engaging in the second communication on the first frequency, the WCD may thereby reduce the likelihood of interference.

In another example of the method, the first communication may be associated with a first air interface protocol and the second communication may be associated with a second air interface protocol. In that case, the WCD may hand off the first communication under the first air interface protocol from the first frequency to a second frequency and engage in the second communication under the second air interface protocol on the first frequency.

In such examples described above, the handing off of the first communication to the second frequency can be performed in response to a determination that the second communication and/or the second air interface protocol has higher priority for use of the first frequency than the first communication and/or the first air interface protocol.

These as well as other aspects, advantages, and alternatives will become apparent to those of ordinary skill in the art by reading the following detailed description, with reference where appropriate to the accompanying drawings. Further, it should be understood that the disclosure provided by this overview and the other description throughout this document is intended to illustrate the invention by way of example only and that numerous variations may be possible.

DETAILED DESCRIPTION

Figure 1:
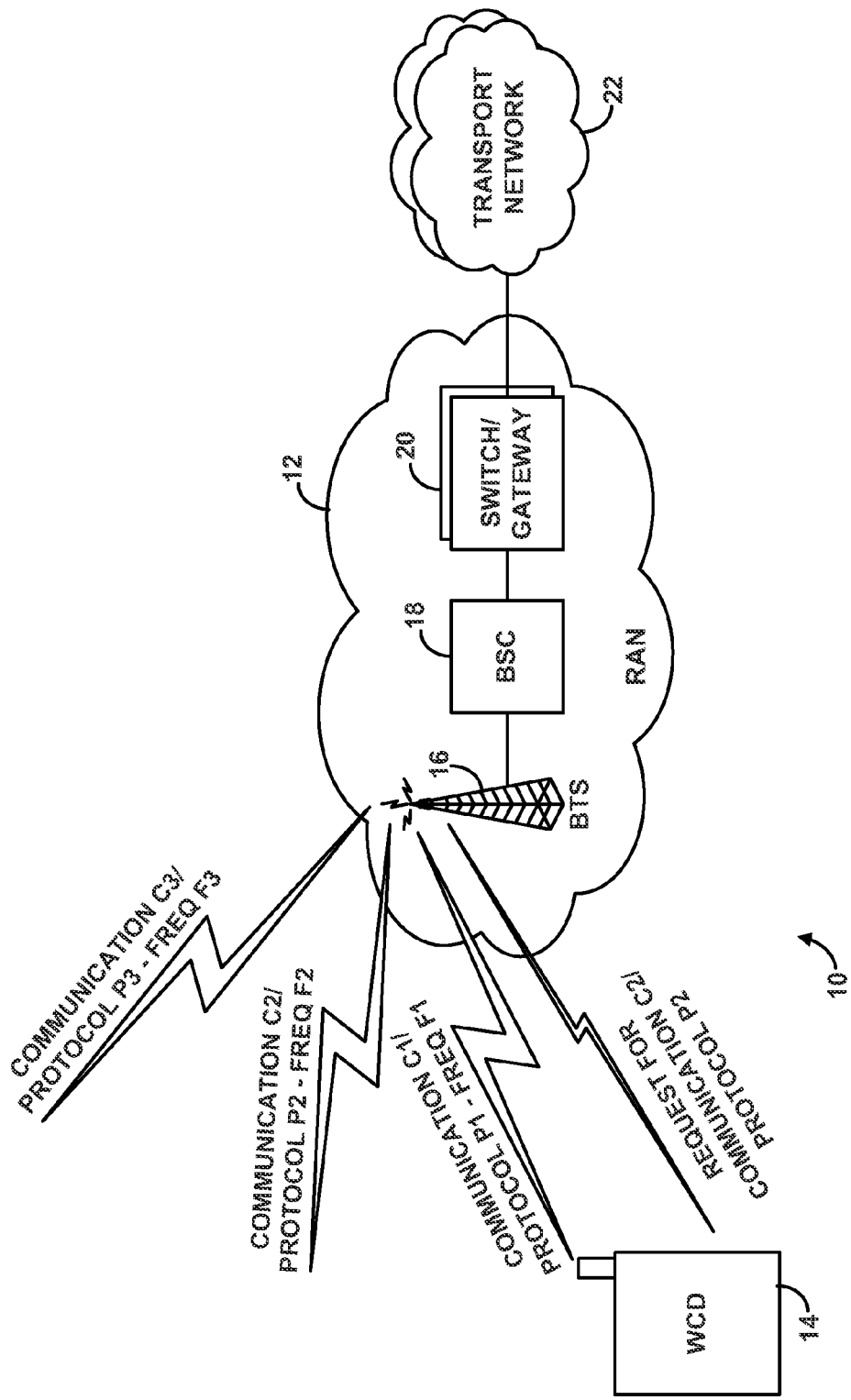
FIG. 1 is a block diagram of a system in a first state, in accordance with one embodiment of the present disclosure.
Figure 2:
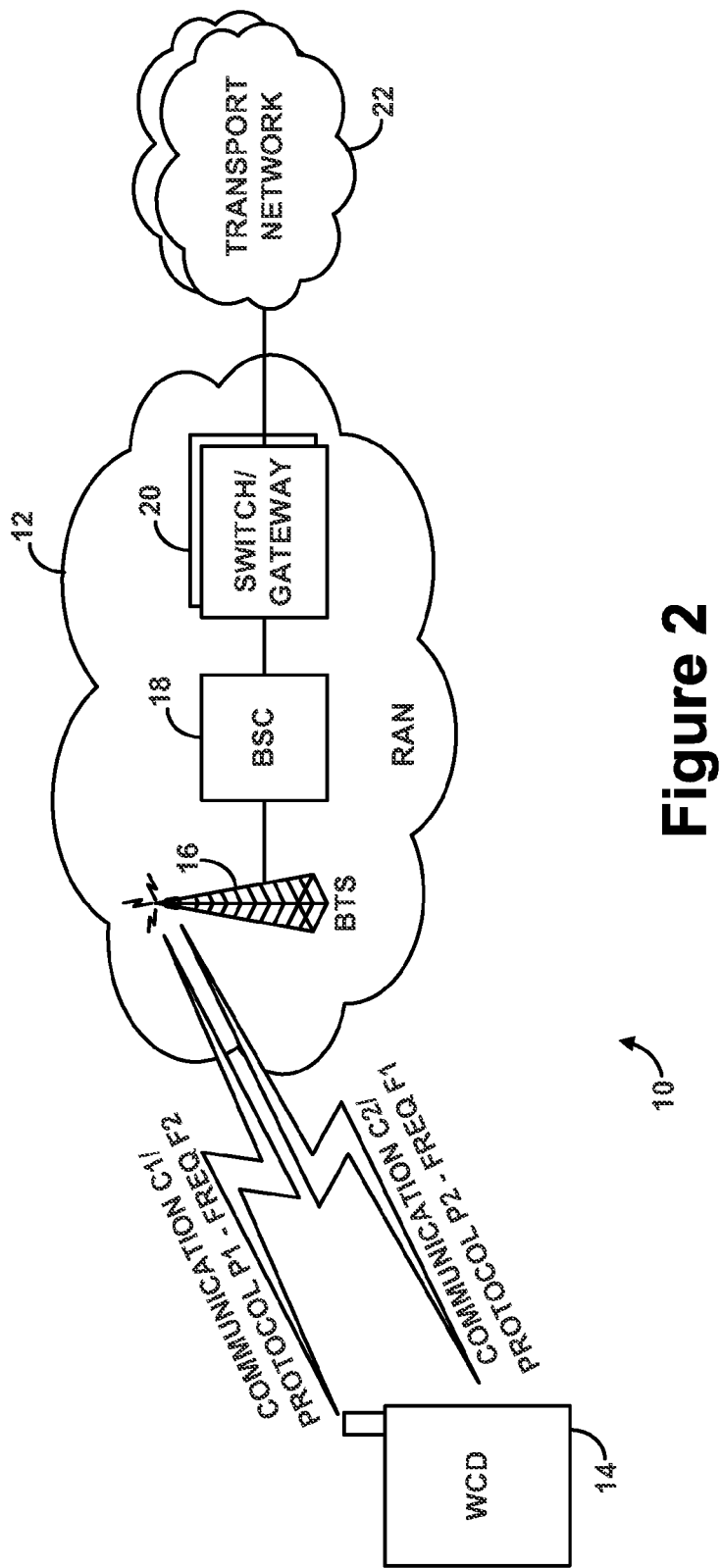
FIG. 2 is another block diagram of the system of FIG. 1 in a second state, in accordance with one embodiment of the present disclosure.

Referring now to FIGS. 1 and 2, a communication system 10 of the present disclosure includes a RAN 12 and a WCD 14 that are configured to engage in wireless communications with each other under one or more air interface protocols, such as the protocols noted above. The RAN 12 and the WCD 14 can also be configured to engage in wireless communications with one or more other RANs or WCDs (not shown). Generally, in the present disclosure, the conjunction "or" should not be interpreted in the sense of an "exclusive or" but, instead, can mean one or the other or both. Illustratively, "RAN or WCD" can mean a RAN or a WCD or both.

The RAN 12 of FIGS. 1 and 2 includes a base transceiver station (BTS) 16, a base station controller (BSC) 18, and a switch (e.g., mobile switching center) and/or gateway (e.g., packet data serving node) 20 that provides connectivity with one or more transport networks 22, such as the public switched telephone network (PSTN) or the Internet. It should be understood, however, that the RAN 12 could just as well take a variety of other forms, the specific details of which are not critical to an understanding of the present disclosure. For instance, the RAN 12 can just as well include a simple wireless access point or other device, regardless of whether the RAN provides connectivity with a transport network.

With the example arrangement shown, the BTS 16 typically includes one or more antennas, power amplifiers, and associated equipment, cooperatively enabling the BTS to radiate in a manner that defines one or more wireless coverage areas, such as a cell and cell sectors. In practice, the BTS 16 may be configured to provide service in each of its coverage areas on one or more defined frequencies, which include one or more frequency bands, one or more frequency channels defined within the frequency band(s), and/or one or more specific frequencies allocated within the frequency channel (s). Although, in practice, generally the RAN 12 and the WCD 14 engage in communications defined on one or more frequency bands and channels. As shown in FIG. 1, by way of example, the BTS 16 may engage in communications C1, C2, and C3 under air interface protocols P1, P2, and P3 on frequencies F1, F2, and F3, respectively. Generally, however, the BTS 16 may engage in any communication C1-C3 under any air interface protocol P1-P3 on any frequency F1-F3.

As mentioned above, the frequencies discussed herein may include specific frequencies, frequency channels, and frequency bands. Illustratively, frequency channels may be defined in a common frequency band, such as one of the bands noted above for instance, and may take various forms. Illustratively, each frequency channel may be a particular 1.25 MHz or 5 MHz block of frequency in the band, or may be a pair of frequency blocks, one for "forward link" communications from the BTS 16 to the WCD 14 and one for "reverse link" communications from the WCD to the BTS. Other arrangements are possible as well.

On each frequency channel, various sub-channels may be defined for carrying control and bearer data between the BTS 16 and the WCD 14. The particular sub-channels may be air interface protocol specific and may therefore take various forms. By way of example, on the forward link, the protocol may define a pilot channel that serves to notify WCDs of the presence of the coverage area, a paging channel for carrying page messages to WCDs, other overhead channels for carrying system parameter information and the like, and a number of traffic channels for carrying bearer traffic (e.g., call traffic) to WCDs. The reverse link, on the other hand, may define an access channel for carrying registration messages, call initiation messages and the like, and a number of traffic channels for carrying bearer traffic to the RAN.

Each of these and potentially other sub-channels may be defined in various ways, such as through code-division multiplexing, time-division multiplexing, or frequency division multiplexing for instance. In a CDMA system, for example, communications in a given coverage area are typically spread-spectrum modulated with a pseudo-noise offset (PN-offset) code associated with the coverage area, and various sub-channels such as the pilot channel, paging channel, and traffic channels are further spread-spectrum modulated with a Walsh code specific to the sub-channel. In other systems, such as CDMA 1xEV-DO systems for instance, the various sub-channels may further be defined through time-division multiplexing on the frequency channel. In still other systems, such as LTE for instance, the various sub-channels may be defined with orthogonal frequency division multiplexing on a plurality of closely spaced sub-carriers. Other examples are possible as well.

To facilitate communication with the RAN 12, the WCD 14 is equipped with one or more radios that can selectively tune to various frequencies and that are arranged to operate in accordance with one or more air interface protocols. In practice, when the WCD 14 first powers on or otherwise does not have an assigned radio link traffic channel, the WCD may scan the airwaves in search of a pilot signal of sufficient strength (e.g., sufficient signal to noise ratio). Upon finding the pilot signal for a particular coverage area, the WCD 14 may then transmit a registration message to the BTS 16 to notify the RAN 12 that the device is in the coverage area. The WCD 14 may then operate in an "idle" mode, in which the WCD is not actively engaged in a call or other traffic communication but the WCD regularly monitors overhead signals in the coverage area to obtain system information and page messages for instance.

When the RAN 12 seeks to connect a voice, data, or other communication to an idle WCD 14, the BTS 16 may transmit a page message to the WCD in the coverage area where the WCD last registered. Upon detecting the page message, the WCD 14 may then respond to the BTS 16, and the BTS may assign an air interface traffic frequency (e.g., forward and reverse link traffic channels or bands) to the WCD, thereby transitioning the WCD to an "active" device state. Likewise, when the WCD 14 seeks to initiate the voice, data, or other communication, the WCD and the BTS 16 may engage in signaling and the BTS may assign an air interface traffic frequency to the WCD, thereby transitioning the WCD to the active state. Further, after a period of inactivity on the assigned air interface traffic frequency, the traffic frequency may be released, thereby transitioning the WCD back to an "idle" (e.g., dormant) state.

In practice, whether the WCD 14 is idle or active, the WCD may regularly evaluate the strength of the pilot signal in its serving coverage area and the strength of pilot signals from neighboring coverage areas. If the WCD 14 detects a pilot signal from another coverage area that is sufficiently stronger than that in its serving coverage area, the WCD may then engage in a handoff to the other coverage area. In the idle mode, for instance, the WCD 14 may simply register with the RAN 12 to notify the RAN that the WCD is now operating in the other coverage area. In the active mode, on the other hand, the WCD 14 may engage in more substantial signaling with the RAN 12 to facilitate handoff of the WCD's active communication session from its currently serving coverage area to the other coverage area.

In a scenario where a coverage area operates on multiple frequencies, an issue for both the WCD 14 and the RAN 12 is which frequency (e.g., frequency band and/or channel) the WCD should operate on. To facilitate selection of a frequency channel, for example, the BTS 16 may broadcast in each of its coverage areas a channel list message (CLM) that lists the frequency channels on which the BTS communicates in the coverage area, and the WCD 14 may be arranged to receive the CLM and to apply a predefined channel-selection process to select a frequency channel from those listed, and to then operate on the selected frequency channel. Further, the BTS 16 may also be arranged to apply the same channel-selection process for the WCD 14 so as to determine the frequency channel to use for communicating with the WCD.

The predefined channel-selection process may be a hashing algorithm keyed to an identifier of the WCD 14, such as a device serial number or directory number, to help randomize distribution of multiple WCDs among the available frequency channels. By way of example, the hashing algorithm may operate on the WCD identifier to produce an index value that points to a particular place in the CLM and therefore identifies which channel to use. For instance, given a CLM that lists frequency channels F1, F2, and F3, a hash result of 0 to 0.33 may point to channel F1, a hash result of 0.34 to 0.66 may point to channel F2, and a hash result of 0.67 to 1.0 may point to channel F3. As a simplified example, such an index value could be produced by taking one tenth of the last digit of the device's serial number, or taking one hundredth of the last two digits of the device's serial number. However, the details of the hashing algorithm are not critical. Further, other channel-selection processes can be applied as well.

In an example implementation, one frequency channel in a multi-channel coverage area may be deemed a primary frequency channel on which the BTS 16 will broadcast the CLM and the WCD 14 will receive the CLM. Alternatively or in conjunction, the CLM may be broadcast on each frequency channel in the coverage area. The WCD 14 may be provisioned with logic, such as a preferred roaming list (PRL), which directs the WCD to the applicable primary channel when the WCD enters into such a coverage area. The WCD 14 may then read the CLM broadcast on that channel and may apply the defined channel-selection process to select one of the frequency channels on which to operate. The CLM in this implementation may list both the primary channel and one or more secondary channels on which the BTS communicates in the coverage area. Thus, through application of a hashing algorithm or other channel-selection process, a subscriber device entering the coverage area can select one of the available channels on which to communicate with the RAN.

In the arrangement of FIG. 1, the WCD 14 is engaging in a first communication C1 under a first air interface protocol P1 on frequency F1. FIG. 1 further depicts a request for the WCD 14 to engage in a second communication C2 on a second air interface protocol P2. Illustratively, the air interface protocol P1 may be CDMA and the air interface protocol P2 may be LTE. In another example, the air interface protocols P1 and P2 can be the same protocol. In yet other examples, the request to engage in the second communication C2 may not specify a particular air interface protocol. Other examples are possible as well.

Optimally, the RAN 12 and the WCD 14 will be configured to engage in the second communication C2 on a different frequency than the first communication C1 to avoid interference between the communications. However, the RAN 12 and the WCD 14 may be engaged in the first communication C1 on frequency F1, which may be preferred, for one reason or another, for use to engage in the second communication C2. Such preference can be based, for instance, on the content or type of communication of C2 or the air interface protocol P2 under which C2 is to be engaged. Consequently, the WCD 14 may experience interference if the communications C1, C2 are not adequately segregated on different frequencies or the communication C2 may be engaged on a non-preferred or non-ideal frequency.

Figure 3:
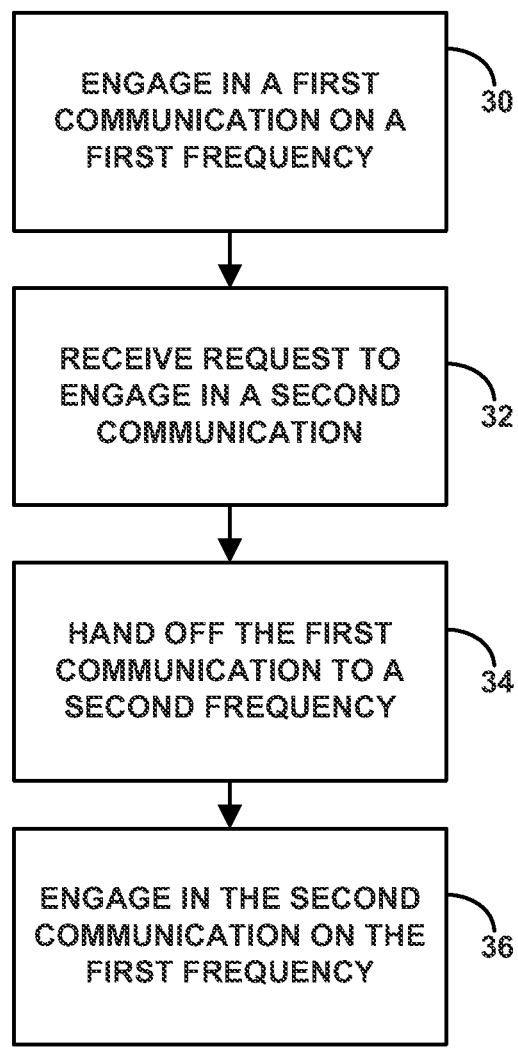
FIG. 3 is a flow chart depicting functions that can be carried out in accordance with one embodiment of the present disclosure.

FIG. 3 is a flow chart depicting functions that can be carried out in accordance with the present disclosure to help address these or other situations. As shown in FIG. 3 and with further reference to FIG. 1, at block 30, a WCD and a RAN engage in a first communication on a first frequency. At block 32, the WCD or the RAN receives a request to engage in a second communication, which is also shown in FIG. 1.

In response to receiving the request to engage in the second communication, at block 34, the WCD or the RAN hands off or otherwise engages in the first communication on a second frequency, as illustrated in FIG. 2. At block 36, the WCD and the RAN engage in the second communication on the first frequency, which is also illustrated in FIG. 2.

In this process, the first frequency may be defined by one or more of a single frequency, a frequency channel, and a frequency band. In practice, the WCD may have selected the first frequency through a selection process as described above or may be operating on the first frequency as a result of another process.

The act of the WCD or the RAN receiving the request to engage in the second communication may take various forms. In one example, the WCD receives the request to engage in a second communication from a user input on the WCD. Illustratively, a user that is utilizing the WCD to engage in a voice communication can access an Internet browser provided on the WCD. The WCD may process the user accessing the Internet browser as a request to engage in a data communication. In other examples, the WCD can receive the request to engage in the second communication in other manners, such as from another WCD or from a RAN.

Referring back to the above example, the WCD that is engaged in the voice communication can transmit such request to engage in a data communication to the RAN. Generally, the WCD can transmit the request to the RAN in various forms, such as by transmitting the request to engage in the second communication within the first communication. In one example, the WCD encodes the request in a data burst message within the first communication. In the context of the above example, the WCD can encode the request as a data burst message within the voice communication. Thereafter, the RAN can receive the request and responsively provide connectivity to the Internet so that the WCD can engage in the data communication through the RAN.

In other examples, a RAN can receive a request to engage in a second communication in other manners. In one case, a first WCD and a first RAN are engaged in a first communication and the first RAN can receive a request to engage in a second communication from a second RAN or a second WCD. Illustratively, the first WCD and the first RAN can be engaged in a first voice or data communication and the first RAN can receive a request to engage the first WCD in a second voice or data communication. Such request can be transmitted to the first RAN directly from a second WCD, from a second RAN, or from some other component of the communication system 10 of FIGS. 1 and 2, for example.

Regardless of how the WCD or RAN receives a request to engage in the second communication, typically, the first and second communications are associated with one or more air interface protocols, as described generally above. Consequently, the WCD and the RAN can be engaged in the first communication under a first air interface protocol on the first frequency and the request to engage in the second communication may be associated with a second air interface protocol. Generally, the type of content of the first communication can be the same as or different from the type of content of the second communication, and the first air interface protocol can be the same as or different from the second air interface protocol. For example, the first communication can be a voice communication and the second communication can be a data communication. In another example, the first and second communications can both be voice communications. In yet another example, the first air interface protocol can be CDMA and the second air interface protocol can be LTE. Other examples are also possible.

Upon receiving the request to engage in the second communication, the WCD or the RAN may determine whether the second communication or the second air interface protocol has associated therewith a higher priority or preference for use of the first frequency than the first communication or the first air interface protocol. Illustratively, the WCD or the RAN may be programmed to give a higher priority or preference to the second communication or the second air interface protocol. In another example, the higher priority or preference associated with the second communication or the second air interface protocol can be stored as data or instructions accessible to the WCD or the RAN to make the determinations.

Such higher priority or preference associated with the second communication or the second air interface protocol for the first frequency can be based on any number of reasons or factors. For instance, the type of content of the second communication may be associated with a preference, for one reason or another, for the first frequency over the type of content of the first communication. Alternatively or in conjunction, the second air interface protocol may be associated with a preference, for one reason or another, for the first frequency over the first air interface protocol. Generally, the reasons for such higher priority or preference can be arbitrary or based on engineering design. For example, the second communication may be associated with a preference for the first frequency due to available bandwidth considerations and/or the second air interface protocol may be associated with a preference for the first frequency due to inherent characteristics of the second air interface protocol. In another example, the second communication or the second air interface protocol may be associated with a preference for the first frequency based on an arbitrary selection to help segregate multiple communications and to minimize the risk of interference between such communications.

If the WCD or the RAN determine that the second communication or the second air interface protocol has higher priority for the first frequency, then the WCD or the RAN may hand off the first communication under the first air interface protocol to a second frequency. The WCD or the RAN can select the second frequency through a selection process as described above or as a result of another process.

The act of handing off the first communication may take various forms. By way of example, the RAN may transmit to the WCD a handoff directive, such as an extended handoff direction message (EHDM) that specifies the frequency on which the WCD is to engage in the first communication. The WCD may then responsively tune to that frequency to continue engaging in the first communication.

As another example, the RAN may transmit to the WCD a frequency-search command, such as a carrier frequency search request message (CFSRQM) that specifies one or more frequencies on which the WCD is to scan for available coverage, including a specification of the second frequency. The WCD may then scan for coverage accordingly, in an effort to find a sufficiently strong pilot signal representing sufficiently strong coverage on one of the specified frequencies. Upon finding such coverage on the second frequency, the WCD may then send to the RAN a response message (e.g., a CFSRQM response message) reporting the found coverage. The RAN may then transmit a handoff directive, such as an EHDM, to the WCD to direct the WCD to hand off the first communication to the second frequency for continued operation under the first air interface protocol.

After handing off the first communication, the WCD and the RAN may engage in the second communication under the second air interface protocol on the first frequency. Consequently, the WCD and the RAN can engage in multiple communications simultaneously while minimizing the risk of interference caused by multiple communications on adjacent or closely spaced frequencies.

The WCD and/or the RAN can perform one or more of the handoff of the first communication and the engaging in the second communication autonomously. Alternatively, the WCD and/or the RAN can perform one or more of the handoff of the first communication and the engaging in the second communication after notifying a user of the WCD or a manager of the communication system and receiving approval from the user or the manager.

As one more particular example, the WCD and the RAN may be engaged in a voice communication under CDMA on the 1.9 GHz band. While the WCD and the RAN are engaged in the voice communication, the WCD may receive a request to engage in a data communication under LTE. Responsive to receiving the request to engage in the data communication under LTE, the WCD or the RAN may determine that the data communication is associated with a preference for the first frequency. Alternatively or in combination, the WCD or the RAN may determine that the LTE air interface protocol is associated with a preference for the first frequency. Responsive to any of such determinations, the WCD and the RAN may hand off the voice communication to a second frequency, for example, to the 800 MHz band, and the WCD and the RAN can then engage in the data communication on the first frequency band, which in the present example is the 1.9 GHz band.

In a slight modification of the above example, the request may simply be to engage in a data communication, without specifying a particular air interface protocol. In this example, the WCD and/or the RAN may determine that the data communication has preference to the first frequency and may also identify a particular air interface protocol that is either preferably assigned to the type of communication or to the first frequency. As discussed above, the WCD and the RAN can then hand off the voice communication to a second frequency and engage in the data communication under the identified air interface protocol on the first frequency.

Figure 4:
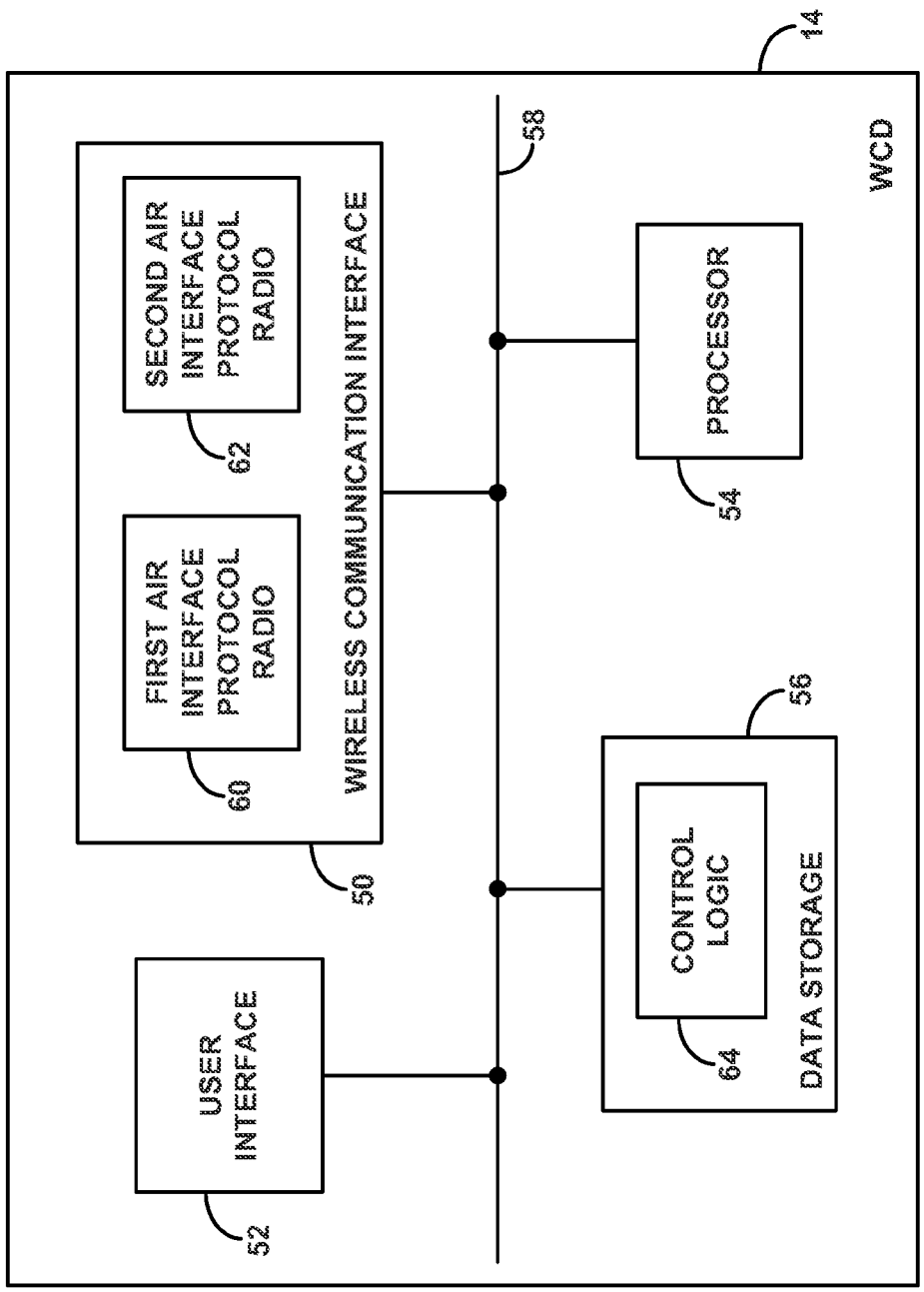
FIG. 4 is a block diagram of a wireless communication device arranged in accordance with one embodiment of the present disclosure.

Referring now to FIG. 4, a simplified block diagram is illustrated showing functional components that can be included in the WCD 14 to facilitate implementation of the method disclosed herein. Example WCDs that may include these functional components include, without limitation, a cell phone, a wirelessly-equipped tablet, notebook, or other computer, a package tracking device, and a wireless communication module embedded in a vehicle, appliance, or other device. Numerous other examples are of course possible as well, and still others may be developed in the future.

As shown in FIG. 4, the WCD includes a wireless communication interface 50, a user interface 52, a processor 54, and data storage 56, all of which may be communicatively linked together by a system bus, network, or other connection mechanism 58.

Wireless communication interface 50 is shown by way of example including two radios 60, 62, one of which is configured to engage in communication under a first air interface protocol P1, and the other of which is configured to engage in communication under a second air interface protocol P2. For instance, the radio 60 may be a CDMA radio and the radio 62 may be an LTE or WiMAX radio. In another example, the radio 60 may be a WiMAX radio and the radio 62 may be an LTE radio. Numerous other examples are possible as well. Further, although the figure shows these two radios as discrete blocks, in practice they may be integrated together. For instance, the radios may be provided as functions on a single chipset. Still further, although not shown expressly, each radio may include an associated antenna, or the radios may share a common antenna.

The radios 60, 62 may include control logic arranged to carry out various WCD functions described herein. For instance, a radio chipset may itself include a processor and stored logic executable by the processor to carry out the described functions. Alternatively, a radio chipset may be otherwise configured as an application specific integrated circuit or the like to carry out the described functions.

The user interface 52 in turn functions to receive input from a user and to provide output to a user, if the WCD is to be operated by an end-user. As such, the user interface may include input components such as a keypad, touchpad, touch-sensitive display, microphone, and camera, and the user interface may further include output components such as a display screen and a sound speaker or headset jack.

The processor 54 may include one or more general purpose processors and/or one or more special purpose processors (e.g., application specific integrated circuits or the like) and may be functionally integrated in whole or in part with the wireless communication interface 50 or other WCD components. The data storage 56 may include one or more volatile and/or non-volatile storage components, such as optical, magnetic, flash, or organic storage components, and may be integrated in whole or in part with the processor 54. As shown, the data storage 56 includes control logic 64 executable by the processor 54 to carry out various WCD functions described herein, instead of or in addition to having a radio processor implement the control logic.

In practice, with this arrangement, when the radio 60 is operating under a first air interface protocol for a first communication on a first frequency, the control logic may receive a request to engage in a second communication. The control logic may determine that the second communication, for one reason or another, has higher priority to the first frequency than the first communication. Responsive to that determination, the control logic may then cause the radio 60 to hand off the first communication engaged under the first air interface protocol on the first frequency to a second frequency. Thereafter, the control logic may cause the radio 62 to operate under a second air interface protocol for the second communication on the first frequency. For instance, the control logic may send a control signal to the radio 60 to cause the radio to change frequencies and perhaps to engage in signaling with a serving RAN to facilitate transitioning from operating under the first air interface protocol on the first frequency to operating under the first air interface protocol on the second frequency. Similarly, the control logic may send a control signal to the radio 62 to cause the radio to signal with the serving RAN to operate under the second air interface protocol for the second communication on the first frequency.

An exemplary embodiment has been described above. It should be understood, however, that variations from the embodiment discussed are possible, while remaining within the true spirit and scope of the invention as claimed.

We claim:

1. A method comprising:
a wireless communication device (WCD) engaging in a first communication on a first frequency under a first cellular air interface protocol;
while the WCD is engaged in the first communication on the first frequency, the WCD receiving a request for the WCD to engage in a second communication under a second cellular air interface protocol; and
responsive to receiving the request, (i) the WCD handing off the first communication from the first frequency to a second frequency and (ii) the WCD engaging in the second communication on the first frequency, wherein the first frequency and the second frequency are different.

2. The method of claim 1, further comprising determining that the second communication has higher priority for use of the first frequency than the first communication, wherein the WCD handing off the first communication and engaging in the second communication are done in response to the determination.

3. The method of claim 1, wherein the first cellular air interface protocol is different from the second cellular air interface protocol.

4. The method of claim 3, further comprising determining that the second air interface protocol has higher priority for use of the first frequency than the first air interface protocol, wherein the WCD handing off the first communication and engaging in the second communication are done in response to the determination.

5. The method of claim 3, wherein the first air interface protocol is Code Division Multiple Access and the second air interface protocol is Long Term Evolution.

6. The method of claim 5, wherein the first frequency is a 1900 MHz frequency band and the second frequency is an 800 MHz frequency band.

7. The method of claim 1, wherein the first communication is a voice communication and the second communication is a data communication.

8. The method of claim 1, further comprising, responsive to receiving the request, the WCD simultaneously (i) handing off the first communication to the second frequency and (ii) engaging in the second communication on the first frequency.

9. The method of claim 1, further comprising, responsive to receiving the request, the WCD autonomously (i) handing off the first communication to the second frequency and (ii) engaging in the second communication on the first frequency.

10. A wireless communication device (WCD) comprising:
a radio module; and
control logic coupled to the radio module and configured to:
operate the radio module to engage in a plurality of communications on a plurality of frequencies, while the radio module is engaged in a first communication on a first frequency under a first cellular air interface protocol, receive a request for the WCD to engage in a second communication under a second cellular air interface protocol, responsive to receiving the request for the WCD to engage in the second communication, request an inter-frequency handoff of the first communication to a second frequency, wherein the first frequency and the second frequency are different, responsive to requesting the handoff, receive approval to hand off the first communication to the second frequency,
responsive to receiving the approval, operate the radio module to (i) engage in the first communication on the second frequency and (ii) engage in the second communication on the first frequency.

11. The WCD of claim 10, wherein the control logic is further configured to:
determine that the second communication has higher priority to use the first frequency than the first communication, and
responsive to receiving the request for the WCD to engage in the second communication and to determining that the second communication has higher priority, request the inter-frequency handoff.

12. The WCD of claim 10, wherein first and second cellular air interface protocols are different.

13. The WCD of claim 10, wherein responsive to receiving the request for the WCD to engage in the second communication under the second air interface protocol, the control logic is configured to:

determine that the second air interface protocol has higher priority to use the first frequency than the first air interface protocol, and responsive to receiving the request for the WCD to engage in the second communication and to determining that the second air interface protocol has higher priority, request the inter-frequency handoff.

14. The WCD of claim 13, wherein the first air interface protocol is Code Division Multiple Access and the second air interface protocol is Long Term Evolution.

15. The WCD of claim 10, wherein the first communication is a voice communication and the second communication is a data communication, and wherein the request is encoded as a data burst message within the voice communication.

* * * * *